United States Patent [19]

Ii et al.

[11] 4,203,666
[45] May 20, 1980

[54] LENSMETER

[75] Inventors: Tadao Ii, Yokohama; Takashi Tanaka, Tokyo; Hayao Akaba, Akishima, all of Japan

[73] Assignee: Hoya Lens Corporation, Tokyo, Japan

[21] Appl. No.: 847,505

[22] Filed: Nov. 1, 1977

[30] Foreign Application Priority Data

Nov. 30, 1976 [JP] Japan ............................ 51/144533

[51] Int. Cl.² .......................................... G01B 9/00
[52] U.S. Cl. ................................ 356/124; 356/125
[58] Field of Search ............ 356/124, 125, 127, 169, 356/170, 171, 151; 235/92 GC; 250/208, 578, 237 G; 364/761, 766, 703

[56] References Cited

U.S. PATENT DOCUMENTS

| 3,360,660 | 12/1967 | Kusch et al. ........................ 356/169 |
| 3,378,677 | 4/1968 | Waldecker et al. ................ 364/766 |
| 3,723,748 | 5/1973 | Coburn et al. ..................... 250/237 G |
| 3,749,925 | 7/1973 | Hertrich ............................. 250/231 SE |
| 3,832,066 | 8/1974 | Cornsweet .......................... 356/127 |
| 4,123,163 | 10/1978 | Chace et al. ....................... 356/127 X |

*Primary Examiner*—John K. Corbin
*Assistant Examiner*—Bruce Y. Arnold
*Attorney, Agent, or Firm*—Sprung, Felfe, Horn, Lynch & Kramer

[57] ABSTRACT

An improved lensmeter comprising a conventional optical system and a novel displaying system. The displaying system includes a linear encoder producing two sets of pulse signals equivalent to the distance and direction of linear movement of the target and circuitry for converting the two sets of pulse signals to a dioptral number of digits, and displaying it. The dioptral number has a plus or minus sign and precision of 0.125 or 0.06 diopters. The displaying system also includes two circuits for displaying at the same time "the power of the sphere" (S) and "the power of the cylinder" (C) of an astigmatic lens respectively as a dioptral number of digits, a rotary encoder and circuitry for displaying "the direction of axis of the cylinder" (Ax) as an angular degree of digits, a (C) sign transposing circuit, and a cylinder form transposing circuit.

18 Claims, 9 Drawing Figures

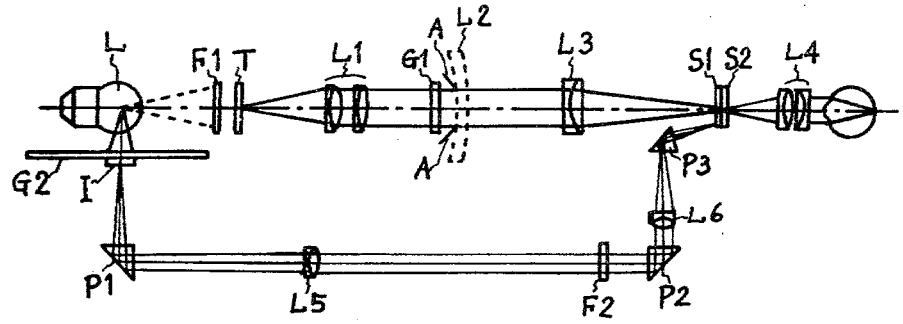
FIG. 1 (PRIOR ART)
FIG. 2
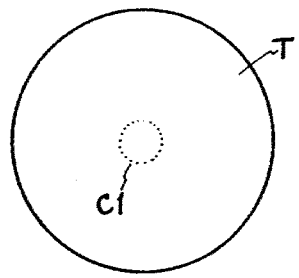
FIG. 3
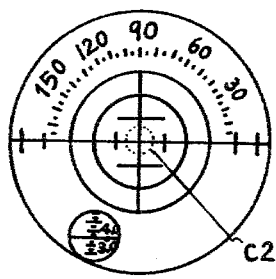
FIG. 4
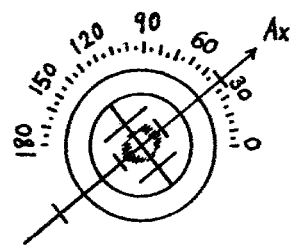
FIG. 5
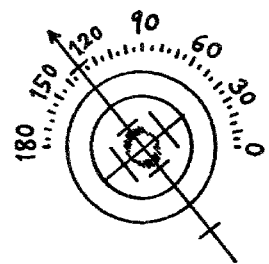

LENSMETER

BACKGROUND OF THE INVENTION

1. Field of the Invention

This invention relates to a novel lensmeter including a novel displaying system for displaying, as a number of digits, each of the ophthalmic properties of spectacle lenses, such as the back vertex refractive power (hereinafter referred to as "power") of a spherical lens, and the powers of the sphere and cylinder, and the direction of the axis of the cylinder of an astigmatic lens.

2. Description of the Prior Art

Lensmeters are the instruments for determining, by direct measurement, powers of spectacle lenses. Conventional lens-meters have generally the optical system as is shown in FIG. 1. In such a system, the pencil of light from lamp L passes through filter F1, target T having a dotted circle or corona C1 at the center as shown in FIG. 2, and through collimeter lens L1 which makes the pencil of light parallel. The pencil of parallel light enters via glass window G1 into a telescope composed of objective lens L3, focus plates S2 combined with angular notation plate S1, and eye lens L4, to focus on plate S2, so that the clear enlarged image of corona C1 of target T focused at the surface of focus plate S2 by objective lens L3 can be observed together with the angular notation of S1 through eye lens L4 of the telescope.

When test-lens L2 is inserted into set frame A in the system, the parallel pencil of light from collimeter lens L1 is refracted by the power of test-lens L2, so that it will be no longer parallel but convergent or divergent. As the result, no image of corona C1 is focused on focus plate S2. Then, target T is moved forwards or backwards along the optic axis so that the pencil of light which emerges from corona C1 and passes through test-lens L2 is again parallel and thus brought again into focus on plate S2, in which a clear image of corona C1 can be again observed. The said excursion of the target corresponds to the power of the sphere of the test-lens.

Conventional lensmeters also have another system as shown in FIG. 1. The system, which serves to convert the excursion of the target to a dioptric indication as shown in the lower portion of FIG. 3, consists of scale plate G2 (FIG. 1) which is movable in connection with target T or collimeter lens L1 and has a dioptric scale corresponding to the power of test-lens L2, index I for denoting a zero point and giving a small circular view as shown in the lower half of FIG. 3, and a device for making the clear image of both of the dioptric scale and the zero point on plate S2, the device consisting of prism P1, lens L5, filter F2, prism P2, lens L6, and prism P3.

It is clear that in a spherical lens when all the meridians of each surface have the same curvature, an image can at least theoretically be formed at a point, whereby corona C1 of target T can be focused on plates S2 to form an image of a similar dotted circle C2 as shown in FIG. 3, that is, a spherical lens can have only one power of the sphere which is independent of the rotation of the test-lens itself.

Unlike spherical lenses, such a phenomenon does not occur in the case of astigmatic lenses, because astigmatic lenses do not always have the same curvature in all the meridians of their surface. Those lenses may be of two types, cylindrical and toric. In the former its horizontal meridian is curved, but its vertical meridian is straight, while in the latter both its meridians are curved, but to a different degree, the vertical meridian being more curved than the horizontal. Where the two meridians in question are at right angles to each other, the condition is termed regular astigmatism; in ophthalmology most astigmatic lenses are regular.

Therefore, it is evident that the more curved meridian will refract the rays incident upon it to a greater degree than the less curved meridian so that, if parallel rays fall upon it, the vertical rays will come to a focus before the horizontal. There are thus two foci. When the vertical rays come to a focus while the horizontal are still converging, the focus is called the first focus, and when the horizontal rays come to a focus, the focus is called the second focus. The image at the both foci will be no longer a dotted circle as seen in FIG. 3, but be a cylinder composed of straight lines. Assuming that the image of corona C1 at the first focus is the image as seen in FIG. 4, the image of the corona at the second focus will be another image as seen in FIG. 5. The direction of the straight lines composing each image will be at right angles to each other. In astigmatic lenses, the dioptral value read at the first focus is generally termed the power of the sphere, denoted as (S), and the dioptral difference value read in going from the first focus to the second focus is termed the power of the cylinder, denoted as (C). The direction of axis of the cylinder is denoted as (Ax), and is the counterclockwise angle formed by the intersection of the direction of straight lines of the cylindrical image and the horizontal line of cross lines of the plate S1, provided that the astigmatic lens is horizontal in the lensmeter.

In a practical procedure for determining (S) and (C) of an astigmatic lens, no matter whether it is concave or convex, by using a conventional lensmeter as shown in FIG. 1, the dioptral power (S1) at a focus is initially determined and the dioptral power (S2) at another focus is then determined, and if the dioptral power (S1) is assumed to be (S), then (S1) minus (S2) is defined as (C). Unfortunately both the absolute value and/or the sign of (S) may vary. Also, the sign of (C) will vary depending on which focus of the two foci is first selected to determine the dioptic power of the lens. In addition to this fact, the format for indicating (S) and (C) differs from country to country. For example, in the United States of America (S) and (C) are indicated by (S) having a positive sign and (C) having a negative sign; in Europe with both having a positive sign; and in Japan with (S) having the same sign as (C) (+ or −) if possible, or otherwise (C) having a negative sign. Accordingly, in the determination of (S) and (C) of convex or concave astigmatic lenses using one of the conventional lensmeters as shown in FIG. 1, it is required that the dioptral power (S1) is first determined at a certain focus; another dioptral power (S2) is determined at another focus; and then the dioptral power (S1') and (S2') are determined in inverse order, i.e., firstly at the second focus and secondly at the first focus, where (S1') being equal to (S2), and (S2') being equal to (S1). This transportation of the focus is termed the "(C) Sign Transposition" or "Cylinder For Transposition" value; thereafer the values (S) and (C) according to the customary format, which differs from country to country, are calculated from (S1), (S2), (S1') and (S2'). However such determinations, and especially such calculations, are not simple, but intricate.

SUMMARY OF THE INVENTION

It is an object of the present invention to provide a lensmeter for displaying the power of a test spherical lens digitally, having the proper plus or minus sign, and with good precision.

A further object of the present invention is to provide a lensmeter for displaying the dioptic values of the power of the sphere, the power of the cylinder, and the direction of the axis of the cylinder (measured counter-clockwise from the horizontal) of a test astigmatic lens digitally including the proper sign and, in any of the formats mentioned hereinbefore.

The present invention relates to a lensmeter comprising a target, an optical system for converting target movement to a power of a test lens and a displaying system for digitially displaying the measured parameters in any of the customary formats, the diopter displaying system comprising:

a linear encoder for producing two sets of pulse signals with a phase difference in which the number of pulses in each set are equal and equivalent to the distance moved by the target and the phase difference between the sets is indicative of the direction of motion of the target, the number of pulses, n, in each of the two sets of pulse signals being equivalent to the distance of movement of the target, measured in dioptral units, n, n being a predetermined integer in the range from four to thirty-two, and first circuitry connected with the linear encoder for converting the two sets of pulse signals with the phase difference to a dioptral number with plus or minus sign, consisting of an integral part produced by dividing the number of pulses of the two sets of pulse signals by said predetermined integer n and a fractional part produced by multiplying the remainder produced by said division, by 1/n, and making the dioptral number display as a digital number with plus or minus sign.

BRIEF DESCRIPTION OF THE DRAWINGS

FIG. 1 is a schematic representation of an optical system in a conventional lensmeter.

FIG. 2 is a front view of the target with a dotted circle or corona.

FIG. 3 is an image of corona C1 focused at the focus plate accompanied with the standard angular notation, and a dioptral indication of the power of the sphere, as viewed in the telescope of a conventional lensmeter when the test lens is a spherical lens.

FIG. 4 is an image, together with the standard angular notation, of the corona at a first focus of a test astigmatic lens as viewed in the telescope of a conventional lensmeter.

FIG. 5 is an image, together with the standard angular notation, of the corona at the second focus of a test-astigmatic lens as viewed in the telescope of a conventional lensmeter.

DETAILED DESCRIPTION OF THE PREFERRED EMBODIMENTS

Figure 6:
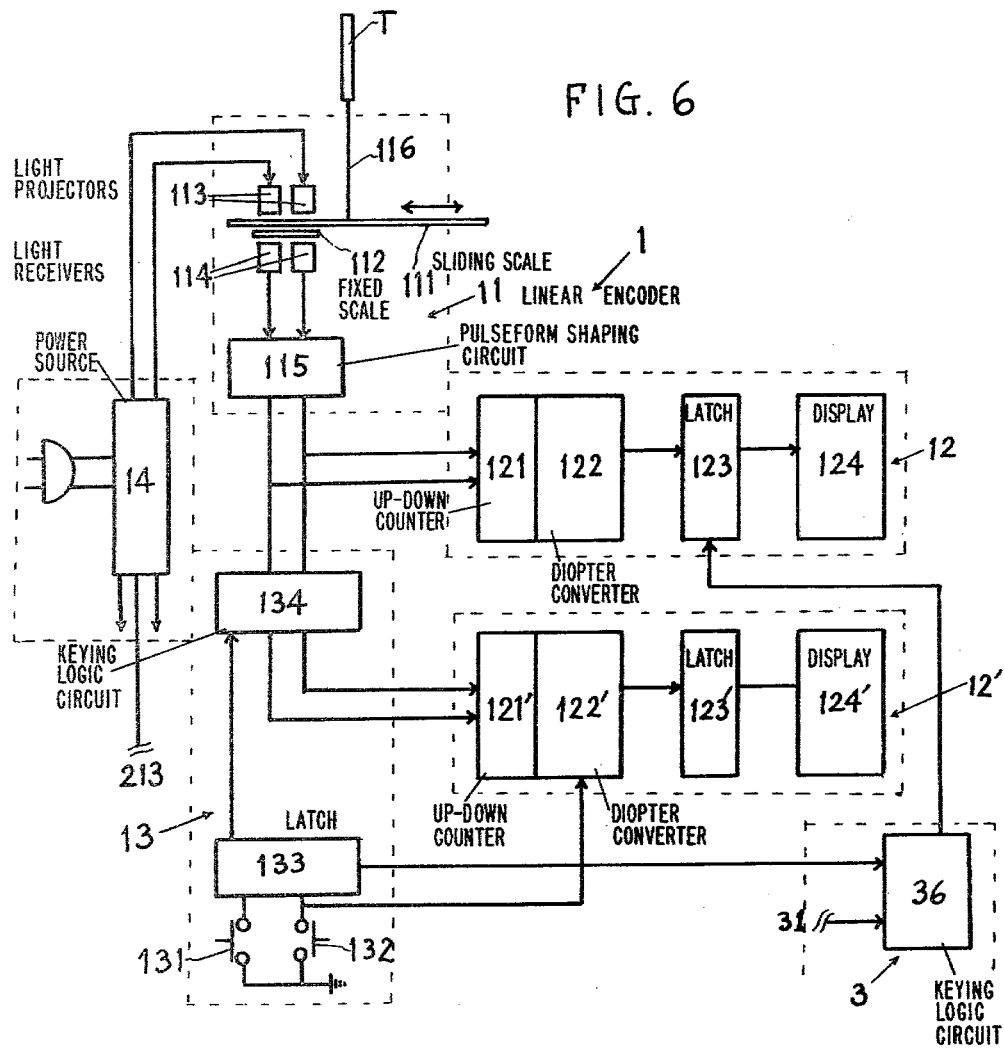
FIG. 6 is a schematic block diagram of a diopter displaying system of a preferred embodiment of this invention.

The diopter displaying system includes a linear encoder and first circuitry connected with the linear encoder.

The linear encoder which is one of the most important features of this invention is characterized by producing two sets of pulse signals with a phase difference in which the number of pulses in each set are equal and equivalent to the distance moved by the target and the phase difference between two sets of pulses is indicative of the moving direction of the target, i.e., the polarity of the power corresponding to the direction of target motion.

The number of pulses (n) of the two sets of pulse signals is equivalent to a distance of movement of one diopter of the target, which is derived from the focal distance of the collimeter lens is important in relationship with the precision of the power to be displayed. The number n is predetermined by selecting from the integers of four to thirty-two, preferably from integers of the m-th power of 2, providing m is an integer of 2, 3, 4 or 5, and is most preferably 4-th power of 2, namely sixteen. This reason is as follows. Spectacle lenses are in practice made in discontinuous power series of such as 0.00, 0.25, 0.50, 0.75, . . . diopter. Therefore, if the display of the power is in decimal numbers such as 0.10, 0.20, 0.30, 0.40, 0.50, . . . diopter, the power of the lens whose power is 0.25 diopter cannot be identified by the decimal display, but if the display is carried out using a $\frac{1}{2}^m$ number system such as $\frac{1}{2}^3$ or 0.125, 0.250, 0.375, 0.500, . . . diopter, the powers of practical spectacle lenses can be easily identified.

An example of the linear encoder consists of a sliding scale, a fixed scale, at least one light projector, two light receivers and a pulseform shaping circuit. The sliding scale, which is fixed perpendicular to the target for motion therewith, is a long plate having a multiplicity of slits of identical narrow width spaced apart longitudinally at a distance equal to the slit width. The fixed scale has two slit windows each of which has slits corresponding in width and interval to that of the sliding scale but slightly different from each other in phase, e.g., by 90 degrees. The sliding scale is slidable forwards and rearwards along the fixed scale. At least one light projector projects rays into the two slit windows and two light receivers are provided for detecting respectively the intensity of the rays from each of the two slit windows. A pulseform shaping circuit such as a Schmitt trigger circuit changes the two electric wave signals from the two light receivers to two electric pulse signals.

When the sliding scale moves, the linear encoder produces two sets of pulse signals having a number of pulses equal to the number of slits moved. If it moves to the left the pulse signal from the light receiver at the right side advances in phase more than that of the left receiver, and if it moves to the right the pulse signal from the light receiver at the left side advances in the phase more than that of the light receiver at the right. These phenomena are caused by the phase difference of two window slits of the fixed scale. Thus, the two sets of pulse signals include therein information differentiating the moving direction of the sliding scale or the target.

The first circuitry connected with the linear encoder is the circuitry for converting the two sets of pulse signals with the phase difference from the linear encoder, to the dioptral number with plus or minus sign. The dioptral number consists of the integral part produced by dividing the number of pulses of the two sets of pulse signals by said predetermined integer n and the fractional part produced by multiplying, by 1/n, the remainder produced by said division, to make the dioptral number display as a number of digits with plus or minus sign. The fractional part appropriately consists of two digits and the integral part consists at most of two digits.

This first circuitry can be designed in different ways by those skilled in the art if the integer n is predetermined.

When n is 10, the design of the first circuitry is easy, when n is $2^m$, it is so difficult that it contains some inventive step. FIG. 6 shows a schematic block diagram of an example of the first circuitry when n is $2^m$. It consists schematically of an up-down counting logic circuit, a converting (to diopter) circuit, a decoding circuit and a displaying circuit. Specifically, the up-down counting logic circuit consists mainly of an up-down differentiating logic circuit for making an exclusive up or down pulse signal from the two sets of pulse signals, an up-down counter (binary coded hexadecimal system) for counting the number of pulses of the up or down pulse signal, and a circuit for detecting the point when the sum of the counted number goes across zero, reversing, at that time, the up or down sign of the up or down pulse signal entering from the up-down differentiating circuit to the counter, and displaying the sign of plus or minus corresponding to the up or down sign reversed at the time. The converting circuit consists mainly of a binary-hexadecimal decoder for decoding the counted binary signal to the signal of from 0 to 15, and a matrix circuit for converting the signal from 0 to 15 to two divided signals representing the number of $\frac{1}{2}^m$, such as 0 and 6 when m=4. The decoding and displaying circuit consists of two decoders for decoding the two divided signals and two displays for displaying the two digits decoded representing the fractional part of the dioptral number. Naturally, the first circuitry further includes another two up-down counters for carrying the counted number, the corresponding decoders and displays for the integral part of the dioptral number, thereby the two counters being both BCD up-down counters and no converting circuit is needed.

The diopter displaying system further includes second circuitry which is substantially the same as the first circuitry, means for resetting the second circuitry (erasing the content of the second circuitry), and means for connecting or disconnecting the second circuitry with the linear encoder. These three are essential to determine the power of the cylinder (C) of an astigmatic lens.

The diopter displaying system further includes preferably means for latching or latch-cancelling the display of the first circuitry. This means makes it possible to display the power of the cylinder (C) on the second circuitry while the display of power of the sphere (S) being held as it is on the first circuitry.

The diopter displaying system further includes most preferably means for connecting the second circuitry with the linear encoder and latching the display of the first circuitry at the same time, and for latch-cancelling the display of the first circuitry, dissociating the second circuitry with the linear encoder, and resetting the second circuitry at the same time. This last means serves to simplify the system for simultaneously displaying (S) and (C).

The diopter displaying system further includes a (C) sign transposing circuit for transposing the (C) sign display of the second circuitry to its opposite sign and simultaneously cancelling the latch display of the first circuitry.

The lensmeter further includes an (Ax) displaying system for displaying a number of digits representing the angular direction of the axis of the cylinder (Ax) of a test astigmatic lens from the focus plate measured counterclockwise from the horizontal.

The (Ax) displaying system includes a rotary encoder and third circuitry connected with the rotary encoder.

The rotary encoder is characterized by producing two sets of pulse signals with a phase difference in which the number of pulses in each are equal and equivalent to the rotating angle and the phase difference indicates the rotating direction of the focus plate. It is enough in the precision that the number of pulses in each of the two sets of pulse signals is 1 degree.

An example of the rotary encoder consists of a rotating circular plate scale having a multiplicity, such as 360, of identical equally spaced radial slits and which is rotated in accordance with the rotation of the focus plate. A fixed circular plate scale is provided having two slit windows each of which has the same several slits at the same spacing as the slits of the rotating scale but slightly different from each other in phase. The rotating scale is rotatable clockwise and counterclockwise around the fixed scale. At least one light projector is provided for projecting rays into the two slit windows and two light receivers detect respectively the intensity of the rays from each of the two slit windows. A pulseform shaping circuit, such as a Schmitt trigger circuit, changes the two signals from the two light receivers to two sets of electric pulse signals. Like the linear encoder, the rotary encoder also produces two sets pulse signals having the number of pulses equal to the number of slits rotated, and the two sets of pulse signals are used to differentiate the direction of rotation of scale.

The third circuitry is the circuitry for converting the two different phase sets of pulse signals to a number of angular degrees ranging from zero to 180 for the number display. The third circuitry can be also designed in different ways by those skilled in the art. For example, it consists schematically of an up-down differentiating logic circuit for producing an exclusive up or down pulse signal by differentiating the directionality of the phase difference of the two sets of pulse signals, an up-down counting logic circuit for counting the up or down pulse signal, a decoding and displaying circuit, and 180 a pulse presetting circuit. The counting, decoding and displaying circuits naturally include another two sets of counters and decoders for carrying, but the last one may be a simple circuit for counting and decoding only 1. The 180 pulses presetting circuit includes a circuit for detecting when the count is zero or 180, and the circuit for loading one hundred and eight tens into the up-down counters by the detection of zero as soon as a down pulse signals further enters into the up-down counters loaded with zero, and for clearing one hundred and eight tens from the up-down counters by the detection of 180 as soon as an up pulse signal further enters into the up-down counters loaded with 180.

The (Ax) displaying system further includes a cylinder form transposing circuit for adding or subtracting 90 up pulses to the up-down counting logic circuit to make the summed number of (Ax)+90°−0°, or (Ax)+90°−180° and displaying the sum digitally.

This cylinder form transposing circuit is preferably carried out together with the aforementioned (C) sign transposing system, whereby the cylinder form transposed always corresponds to the (C) sign transposed, that is, if (Ax) corresponds to the plus sign of (C), (Ax)+90° will correspond to minus sign of (C).

Figure 7:
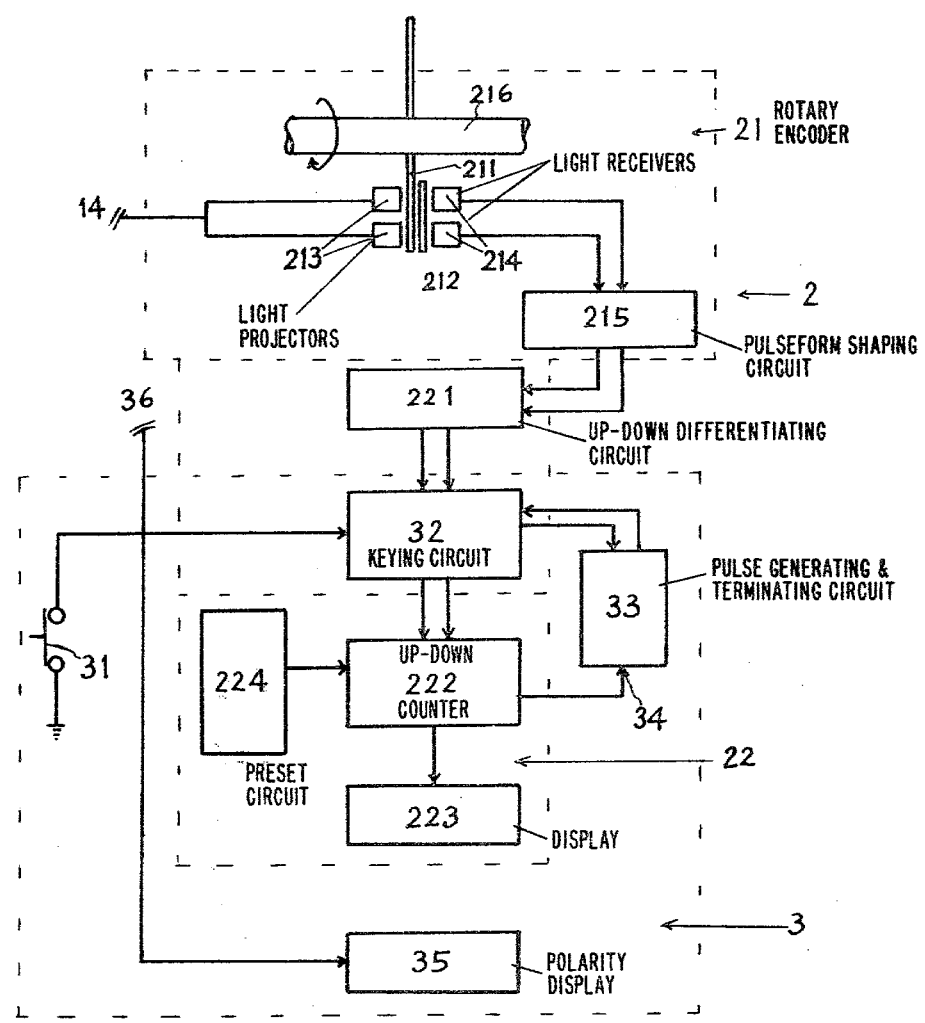
FIG. 7 is a schematic block diagram of the (Ax) displaying system of a preferred embodiment of this invention.

An embodiment of the displaying system including the first and second circuits, the means accompanied with the two circuits, the third circuit, the (C) sign transposing circuit and the cylinder form transposing circuit is shown in a schematic block diagram of FIGS. 6 and 7.

In FIG. 6, there is shown target T, diopter displaying system 1 consisting of linear encoder 11, first circuit 12, second circuit 12', and the circuit 13 for changing from (S) to (C). Linear encoder 11 consists of sliding scale 111, fixed scale 112, two light projectors 113, two light receivers 114, pulseform shaping circuit 115, and connecting plate 116. The first circuit 12 consists of up-down counting logic circuit 121, converting (to diopter) circuit 122, decoder, driver and latch 123 and display 124. The second circuit 12' consists of up-down counting logic circuit 121', converting circuit 122', decoder, driver and latch 123' and display 124'. The changing circuit 13 for changing from (S) display of the first circuit to (C) display of the second circuit consists of latch switch 131, latch cancel switch (reset switch) 132, latch circuit (flip-flop) 133, and keying logic circuit (logic gate) 134. 14 is an electric source, and 36 is keying logic circuit for (C) sign transposition.

In FIG. 7, there is shown the (Ax) displaying system 2 consisting of rotary encoder 21, third circuit 22 and (C) sign and cylinder form transposition circuit 3. The rotary encoder consists of rotating circular plate scale 211, fixed circular plate scale 212, two light projectors 213, two light receivers 214, pulseform shaping circuit 215, and shaft 216 for rotating circular plate scale 211 in strict accordance with the focus plate. The third circuit consists of up-down differentiating logic circuit 221, up-down counting logic circuit 222, decoder and display 223, and 180 pulses presetting circuit 224.

The (C) sign and cylinder form transposing circuit 3 consists of switch 31, keying logic circuit 32, 90 pulses generating circuit 33, 90th pulse terminating circuit 34, polarity displaying circuit and light lamp 35, and keying logic circuit 36 (FIG. 6).

Figure 8:
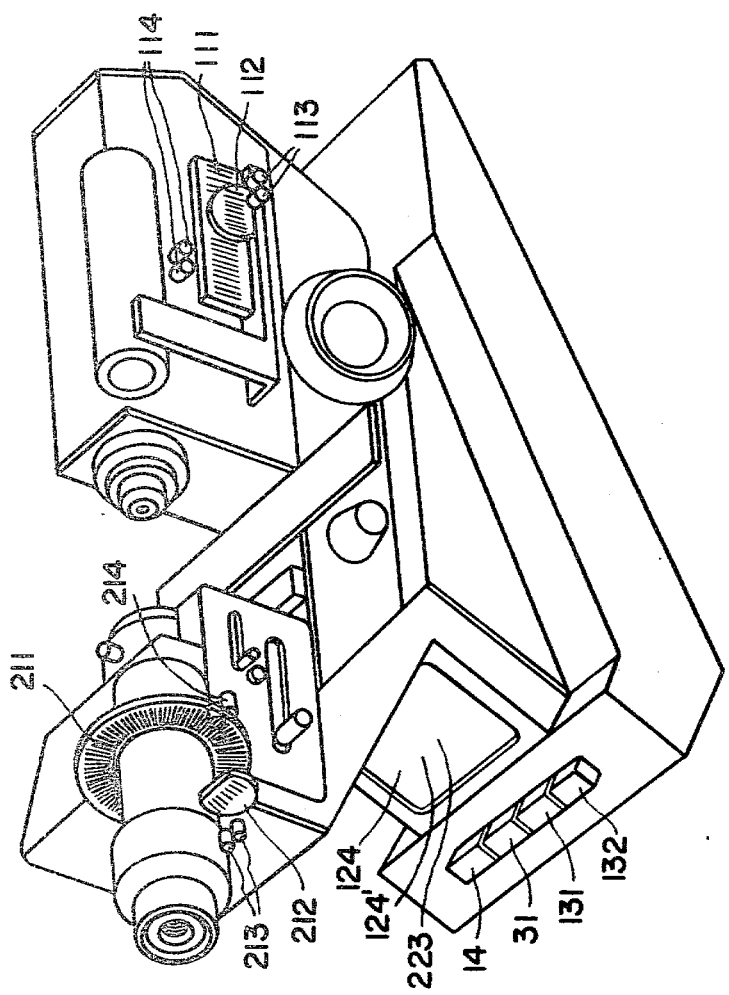
FIG. 8 is a perspective view of a lensmeter of a preferred embodiment of this invention.

FIG. 8 is a perspective view of the lensmeter of a preferred embodiment of this invention. The numbers represent the same elements as in FIGS. 6 and 7.

Figure 9:
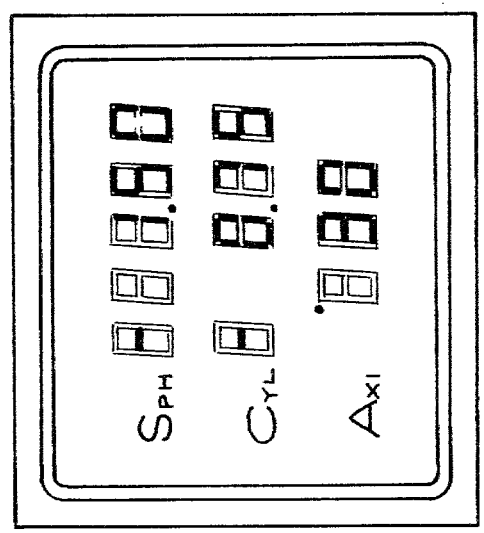
FIG. 9 is a front view of a display part of the lensmeter of a preferred embodiment of this invention.

FIG. 9 is a front view of a display part of the lensmeter of a preferred embodiment of this invention. In this case minus signs of (S) and (C) displays are shown with − sign, but plus sign thereof are shown with no sign. Point marks of (S) and (C) displays represent a decimal point respectively, and the point mark of (Ax) display represents the performance of (C) sign or cylinder form transposition.

According to the lensmeter of the present invention, ophthalmic properties of an astigmatic lens such as the powers of the sphere and cylinder, and the direction of axis of the cylinder can be easily determined in any way of the indications before mentioned by using the (C) sign and cylinder form transposing circuits in the diopter displaying and (Ax) displaying system.

The target of the lensmeter is first set at the zero point. In the optical system, if the collimeter lens is fixed the target is moved to determine the power, and if the target is fixed the collimeter lens is moved. In this invention, all of the description is carried out in the case when the collimeter lens is fixed and the target is moved.

An astigmatic lens to be tested is then set, thereafter the target is moved to make a first focus of the astigmatic lens on the focus plate. This target's movement from zero point to the first focus is encoded by the linear encoder to produce two sets of pulse signals with a phase difference. The two sets of pulse signals are converted and displayed by the first circuitry as a number of digits with plus or minus sign having the fractional part of two digits with precision of 0.06 diopter unit, the number representing the power of the sphere (S).

The target is then moved to another second focus of the astigmatic lens on the focus plate, after the second circuit has been connected with the linear encoder. The target's movement from the first focus to the second focus is encoded by the linear encoder to produce two sets of pulse signals with a phase difference. The two sets of pulse signals are converted and displayed by the second circuit as a number of digits with plus or minus sign having the same precision as that of the (S) display, the number representing the power of the cylinder (C).

If the display of the first circuit is latched during the target's movement from the first focus to the second focus, the number (S) is held as it is together with the number (C).

Thereafter, the display of the first circuit is latch cancelled, the second circuit is reset, and the second circuit is dissociated with the linear encoder at the same time, thereby the display of the first circuit indicates the number of (S)+(C), and the display of the second circuit is cleared, thus the diopter displaying system is ready to start the next measurement.

After the powers of the sphere and cylinder have been measured, the sign display of the second circuit is transposed to its opposite sign and the latch of the display of the first circuitry is simultaneously cancelled by the (C) sign transposing means, thereby the (S') and (C') transposed are respectively displayed as a number of digits with plus or minus sign.

The focus plate is rotated to cause the horizontal line of the cross lines thereof to coincide with the direction of the axis of the text astigmatic lens. The focus plate's rotation is encoded by the rotary encoder to produce two sets of pulse signals with a phase difference. The two sets of pulse signals are converted and displayed by the third circuit as a number of digits ranging from zero to 180 with the precision of one degree, the number corresponding to the direction of axis of the cylinder.

Ninety up pulses are added to or substracted from the third circuitry by means of the cylinder form transposing circuit after the (Ax) has been measured, to make the number of Ax+90°−0°, or Ax+90°−180°, this operation being termed cylinder form transposition. The cylinder form transposition is preferably performed together with the said (C) sign transposition, thereby the cylinder form transposed, namely (Ax)+90°, always corresponds to the (S') and (C') transposed.

Features and advantages of the lensmeter of the present invention are as follows:

(1) The powers of the sphere and cylinder of an astigmatic lens under test can be determined directly as the display of dioptral number of digits with plus or minus sign with good accuracy, the precision being of 0.06 order. The display can be chosen to have any of the various forms of indication such as Japanese, American, or European mentioned before. The direction of axis of the cylinder can be also determined as angular degree of digits represented according to the standard notation adopted by the Optical Society. Accordingly, the apparatus is free from reading mistakes of operators and reading biases which have been the problem in determinations by conventional lensmeters.

(2) In conventional lensmeters, the zero point which is most clearly visible fluctuates for each operator and does not always coincide to the fixed zero point, so that the zero point can be hardly identified. On the contrary, in this lensmeter, the zero digit on the display can be always set at the zero point which is most clearly visible by an operator, and moreover the zero point once set can be easily revived any time, so that biases and deviations of the zero point set can be minimized; consequently more true dioptral values of (S) and (C) and more true angular degree value of (Ax) can be determined. Besides, since the zero point and the stop position of the target are memorized even in the case of an electric power interruption, the adjustment of zero point in every determination is unnecessary.

(3) Since all determination procedures are carried out electrically, the operation of (C) sign transposition and cylinder form transposition and their repetitions can all be carried out only by switching operations; accordingly (S) and (C) displays can be easily determined without any other operation and calculation.

(4) Since all the results are digital, a printer can be easily introduced.

(5) Since the electric circuits can be made by MOS in a low electric power consumption integrated circuit, batteries can be employed as the power source, so that the lensmeter can be a portable-sized one.

While the invention has been described in detail and with reference to specific embodiments thereof, it will be apparent to one skilled in the art that various changes and modifications can be made therein without departing from the spirit and scope thereof.

The embodiments of the invention in which an exclusive property or privilege is claimed are defined as follows:

1. A lensmeter comprising, a target, an optical system for converting a power of a test lens to the relative movement of the target with respect to the test lens and a diopter displaying system for digitally displaying the dioptral number of digits with plus or minus sign of the power from the relative target movement, the diopter displaying system comprising:

a linear encoder for producing two sets of pulse signals with a phase difference, wherein the number of pulses in each set is equal and corresponds to the relative distance moved by the target and the phase difference corresponds to the direction of motion of the target, and the number of pulses of the two sets of pulse signals which corresponds to the distance of movement for one diopter is n, n being a predetermined integer in the range from four to thirty-two, first circuitry connected with the linear encoder for converting the two sets of pulse signals with the phase difference to a dioptral number with plus or minus sign including means for dividing the number of pulses of the two sets of pulse signals by said predetermined integer n to obtain the integer part of the number and a remainder and means for multiplying the remainder by 1/n to obtain the fractional part of the number, second circuitry substantially the same as the first circuitry, means for resetting the second circuitry, and means for alternatively connecting or dissociating the second circuitry with the linear encoder.

2. The lensmeter as claimed in claim 1, wherein the diopter displaying system further comprises means for alternatively latching or latch-cancelling the display of the first circuitry.

3. The lensmeter as claimed in claim 2, wherein the lensmeter further comprises:

an (Ax) displaying system for digitally displaying a number of digits representing the direction of axis of the cylinder of a test astigmatic lens for a rotating angle of the focus plate, the (Ax) displaying system comprising a rotary encoder for producing two sets of pulse signals with a phase difference in which the number of pulses are the same and correspond to the rotating angle and the phase difference indicates the rotating direction of the focus plate, and third circuitry connected with the rotary encoder for converting the two sets of pulse signals to a number of angular degrees ranging from zero to 180 to make the display a number of digits.

4. The lensmeter as claimed in claim 3, wherein the rotary encoder comprises a rotating circular plate scale having 360 identical equally spaced radial slits and which rotates in accordance with the rotation of the focus plate, a fixed circular plate scale having two slit windows each of which has slits at the same spacing as the slits of the rotating scale but slightly different from each other in phase, the rotating circular plate scale being rotatable clockwise and counter-clockwise around the fixed scale, at least one light projector for projecting rays into the two slit windows, two light receivers for detecting respectively the intensity of the rays from each of the two slit windows, and a pulseform shaping circuit for changing the two electric wave signals from the two light receivers to two electric pulse signals.

5. The lensmeter as claimed in claim 3, wherein the third circuitry comprises:

an up-down differentiating logic circuit for providing up or down pulse signals from the two sets of pulse signals according to the phase difference, a BCD up-down counter for counting the up or down pulse signals, and a corresponding decoder and display, two up-down counters, two decoders and two displays for carrying the counted number, a 180 pulse presetting circuit comprising a circuit for detecting the occurrence of zero or 180 in the sum of the counted number, and a circuit for loading one hundred and eight tens into the up-down counters upon the detection of zero when a down pulse signal is applied to the up-down counters loaded with zero, and for clearing one hundred and eight tens from the up-down counters by the detection of 180 when an up pulse signal is applied to the up-down counters loaded with 180.

6. The lensmeter as claimed in claim 3, wherein the first circuitry is further associated with the means for latching or latch-cancelling the display of the first circuitry from the pulse signal sent from the linear encoder.

7. A lensmeter comprising, a target, an optical system for converting a power of a test lens to the relative movement of the target with respect to the test lens and a diopter displaying system for digitally displaying the dioptral number of digits with plus or minus sign of the power from the relative target movement, the diopter displaying system comprising:

a linear encoder for producing two sets of pulse signals with a phase difference, wherein the number of pulses in each set is equal and corresponds to the relative distance moved by the target and the phase difference corresponds to the direction of motion of the target, and the number of pulses of the two sets of pulse signals which corresponds to the distance of movement for one diopter is n, n being a predetermined integer in the range from four to thirty-two, first circuitry connected with the linear encoder for converting the two sets of pulse signals with the phase difference to a dioptral number with pulse or minus sign including means for dividing the number of pulses of the two sets of pulse signals by said predetermined integer n to obtain the integer part of the number and a remainder and means for multiplying the remainder by 1/n to obtain the fractional part of the number, wherein the first circuitry comprises:

an up-down differentiating logic circuit for providing up or down pulse signals from the two sets of pulse signals according to the phase difference therebetween, an up-down binary coded hexadecimal counter for counting the up or down pulse signal, a circuit for detecting when the sum in the counter passes zero, reversing at that time the up or down sign of the up or down pulse signal entering from the up-down differentiating logic circuit to the counter, and displaying the sign of plus or minus corresponding to the up or down sign reversed at the time, a binary-hexadecimal decoder for decoding the counted binary signal to a signal in the range of from 0 to $2^m$, a matrix circuit for converting the signal of from 0 to $2^m$ to two divided signals representing the number of $\frac{1}{2}^m$, two decoders for decoding the two divided signals, two displays for displaying the two digits decoded, which represent the fractional part of the dioptral number, two up-down BCD counters for carrying the counted number, and two further corresponding decoders and two displays, which represent the integer part of the dioptral number.

8. The lensmeter as claimed in claim 7, wherein the predetermined integer n is an m-th power of 2, m being selected from the integers 2, 3, 4 or 5.

9. The lensmeter as claimed in claim 8, wherein m is 4.

10. The lensmeter as claimed in claim 7, wherein the linear encoder comprises a sliding scale including a long plate having a multiplicity of slits of identical narrow width and spaced apart longitudinally at a distance equal to the width and fixed to the target, a fixed scale having two slit windows each of which has several slits corresponding in width and interval to the slits of the sliding scale but slightly different from each other in phase, the sliding scale being slidable forwards and rearwards along the fixed scale, at least one light projector for projecting rays into the two slit windows, two light receivers for detecting respectively the intensity of the rays from each of the two slit windows, and a pulseform shaping circuit for changing the two electric wave signals from the two light receivers to two electric pulse signals.

11. A lensmeter comprising, a target, an optical system for converting a power of a test lens to the relative movement of the target with respect to the test lens and a diopter displaying system for digitally displaying the dioptral number of digits with plus or minus sign of the power from the relative target movement, the diopter displaying system comprising:

a linear encoder for producing two sets of pulse signals with a phase difference, wherein the number of pulses in each set is equal and corresponds to the relative distance moved by the target and the phase difference corresponds to the direction of motion of the target, and the number of pulses of the two sets of pulse signals which corresponds to the distance of movement for one diopter is n, n being a predetermined integer in the range from four to thirty-two, first circuitry connected with the linear encoder for converting the two sets of pulse signals with the phase difference to a dioptral number with plus or minus sign including means for dividing the number of pulses of the two sets of pulse signals by said predetermined integer n to obtain the integer part of the number and a remainder and means for multiplying the remainder by 1/n to obtain the fractional part of the number, second circuitry substantially same as the first circuitry, and means for connecting the second circuitry with the linear encoder and selectively latching the display of the first circuitry and latch-cancelling the display of the first circuitry, dissociating the second circuitry with the linear encoder, and resetting the second circuitry.

12. The lensmeter as claimed in claim 11, wherein the diopter displaying system further comprises a (C) sign transposing circuit for transposing the sign display of the second circuitry to its opposite sign and simultaneously cancelling the latching of the display of the first circuitry.

13. The lensmeter as claimed in claim 11, wherein the lensmeter further comprises an (Ax) displaying system for digitally displaying the number of digits representing the direction of axis of the cylinder of a test astigmatic lens from the rotating angle of the focus plate, the (Ax) displaying system comprising:

a rotary encoder for producing two sets of pulse signals with a phase difference in which the number of pulses are the same and correspond to the rotating angle and the phase difference indicates the rotating direction of the focus plate, and third circuitry connected with the rotary encoder for converting the two sets of pulse signals with the phase difference to a number of angular degrees ranging from zero to 180 to make the display as a number of digits.

14. The lensmeter as claimed in claim 13, wherein the lensmeter further comprises a cylinder form transposing circuit for adding 90 to the number of angular degrees of the third circuitry to make the summed number of $(Ax)+90°-0°$, or $(Ax)+90°-180°$ display as a number of digits, and a (C) sign transposing circuit for transposing the display sign of the second circuitry to its opposite sign and simultaneously cancelling the latch of the display of the first circuitry.

15. A method for measuring ophthalmic properties of a test astigmatic lens, comprising the steps of:
(1) encoding the distance and direction of a target's relative linear movement from zero point to a first focus of the test astigmatic lens to produce two sets of pulse signals with a phase difference wherein the number of pulses is the same and corresponds to the relative distance moved by the target and the phase difference corresponds to the direction of movement of the target and thereby the polarity of power of sphere of the astigmatic lens at the first focus, and the number of pulses of the two sets of pulse signals which corresponds to a distance of movement of one diopter of the target is n, n being a predetermined integer in the range from four to thirty-two,
(2) converting the two sets of pulse signals with the phase difference to a dioptral number with plus or minus sign, consisting of an integer part produced by dividing the number of pulses of the two sets of pulse signals by said predetermined integer n and a fractional part with two digits produced by multiplying, by 1/n, the remainder produced by said division, to make the dioptral number display as a number composed of an integer part of two digits and a fractional part of two digits with plus or minus sign, whereby the number corresponds to the power of the sphere (S) of the test astigmatic lens, said steps (1)–(2) being performed in first circuitry connected with a linear encoder,
(3) encoding the distance and direction of the target's linear movement from the first focus to another second focus of the test astigmatic lens to provide two sets of pulse signals with a phase difference in the same manner as in step (1),
(4) converting the two sets of pulse signals with the phase difference to the dioptral number with plus or minus sign to make the dioptral number display as a digital number with plus of minus sign in the same manner as in the step (2), whereby the number with plus or minus sign corresponding to the power of the cylinder (C) of the test astigmatic lens, said steps (3)–(4) being performed in second circuitry connected with the linear encoder,
(5) latching the display on the first circuitry while the steps (3)–(4) are being performed, whereby the (S) display being held as it is during the steps (3)–(4),
(6) latch-cancelling the display on the first circuitry after said steps (3)–(4) have been completed, resetting the second circuitry and dissociating the second circuitry with the linear encoder at that time, thereby freeing the diopter displaying system to start the next measurement.

16. The method as claimed in claim 15, wherein the method further comprises the steps of:
(7) transposing the plus or minus sign display of the second circuitry to the opposite sign display, simultaneously latch-cancelling the display of the first circuitry, and lighting a part of the display to indicate the performance of the sign transposition, whereby the powers of sphere and cylinder in the case when they are firstly measured at the second focus and secondly at the first focus can be respectively displayed as the number of digits with sign, said transposition being termed (C) sign transposition.

17. The method as claimed in claim 16, wherein the method further comprises the steps of:
(8) encoding the angle and direction of the focus plate's rotation which is operated to cause the horizontal of cross lines of the focus plate to coincide with the direction of axis of the test astigmatic lens to produce two sets of pulse signals with a phase difference in which the number of pulses is equal and equivalent to the rotating angle and the phase difference indicates the rotating direction of the focus plate,
(9) converting the two sets of pulse signals with the phase difference to a number of angular degrees in the range of from zero to 180 to make the display a digital number, whereby the number corresponding to the direction of axis of the cylinder (Ax) of the test astigmatic lens, said steps (8)–(9) being performed in the third circuitry connected with the rotary encoder.

18. The method as claimed in claim 17, wherein the method further comprises the steps of:
(10) adding the number 90 to the number of angular degrees of (Ax) of the third circuitry to make the summed number in the range from zero to 180 and displaying the summed number as a number digits, whereby the number corresponds to $(Ax)+90°-0°$, or $(Ax)+90°-180°$, the performance of step (10) being termed cylinder form transposition, and this cylinder form transposition being performed together with the (C) sign transposition in step (7).

* * * * *